United States Patent
Pape et al.

(10) Patent No.: US 12,313,444 B2
(45) Date of Patent: May 27, 2025

(54) LOAD DETECTION DEVICE

(71) Applicant: ZF Friedrichshafen AG, Friedrichshafen (DE)

(72) Inventors: Dennis Pape, Ostercappeln (DE); Julian Stratmann, Bad Essen (DE); Christoph Werries, Bissendorf (DE); Michael Klank, Osnabrück (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 491 days.

(21) Appl. No.: 17/770,214

(22) PCT Filed: Oct. 12, 2020

(86) PCT No.: PCT/EP2020/078527
§ 371 (c)(1),
(2) Date: Apr. 19, 2022

(87) PCT Pub. No.: WO2021/094040
PCT Pub. Date: May 20, 2021

(65) Prior Publication Data
US 2022/0381603 A1 Dec. 1, 2022

(30) Foreign Application Priority Data
Nov. 14, 2019 (DE) .................. 10 2019 217 592.9

(51) Int. Cl.
*G01G 19/42* (2006.01)
*G01B 21/08* (2006.01)
*G01C 21/16* (2006.01)
*G01G 19/08* (2006.01)

(52) U.S. Cl.
CPC ............. *G01G 19/42* (2013.01); *G01B 21/08* (2013.01); *G01C 21/16* (2013.01); *G01G 19/08* (2013.01)

(58) Field of Classification Search
CPC .......... G01G 19/42; G01G 19/08; G01G 9/14; G01B 21/08; G01C 21/16; B60T 8/185;
(Continued)

(56) References Cited

U.S. PATENT DOCUMENTS 4,787,644 A * 11/1988 Yokote ............... B60G 17/0523
280/DIG. 1
6,308,177 B1 * 10/2001 Israni ................... G08G 1/0969
701/461

(Continued)

FOREIGN PATENT DOCUMENTS

| DE | 10 2015 015 283 | 6/2016 |
|----|-----|-----|
| DE | 10 2014 215 440 | 11/2016 |

(Continued)

OTHER PUBLICATIONS

German Patent Office, Search Report issued for German Patent Application No. 10 2019 217 592.9, (Jul. 24, 2020).

(Continued)

*Primary Examiner* — Jacques M Saint Surin
(74) *Attorney, Agent, or Firm* — Finch & Maloney PLLC

(57) ABSTRACT

Disclosed is a load detection device and method using the same. In one example, the device includes a height-level measuring unit configured to determine a height level of a vehicle and to generate at least one height-level signal that characterizes the height level. A position-measuring unit is configured to determine the position of the vehicle relative to the mid-point of the earth and to generate at least one position signal that characterizes the vehicle position. An evaluation unit is coupled to the height-level measuring unit and to the position-measuring unit. The evaluation unit is configured to determine a mass of a load of the vehicle, taking into account the height-level signal(s) and the posi- (Continued)

tion signal(s). The device can be used to determine the mass of the load, which may include a number of persons.

12 Claims, 2 Drawing Sheets

(58) Field of Classification Search
CPC .......... B60T 2260/06; B60G 2800/702; B60G 2400/252; B60G 2400/0511; B60G 2400/0512; B60G 2300/02; B60G 2300/10; B60G 2300/14; B60G 2400/824; B60G 2400/60; B60G 2800/70
USPC .............................................................. 177/1
See application file for complete search history.

(56) References Cited

U.S. PATENT DOCUMENTS

| | | | | |
|---|---|---|---|---|
| 7,197,500 | B1* | 3/2007 | Israni | G01C 21/3815 |
| | | | | 701/461 |
| 7,877,178 | B2* | 1/2011 | Lu | B60T 8/17551 |
| | | | | 701/124 |
| 7,877,201 | B2* | 1/2011 | Lu | B60T 8/241 |
| | | | | 701/124 |
| 11,518,534 | B2* | 12/2022 | Deforet | B64D 27/40 |
| 2018/0052037 | A1 | 2/2018 | Minoshima | |
| 2019/0193505 | A1* | 6/2019 | Balogh | B60G 17/016 |
| 2019/0337523 | A1 | 11/2019 | Rogness et al. | |

FOREIGN PATENT DOCUMENTS

| | | |
|---|---|---|
| DE | 10 2015 212 347 | 1/2017 |
| DE | 10 2017 009 146 | 4/2018 |
| DE | 10 2017 202 178 | 8/2018 |

OTHER PUBLICATIONS

European Patent Office, Search Report issued for PCT Patent Application No. PCT/EP2020/078527 (Feb. 5, 2021).
European Patent Office, Written Opinion issued for PCT Patent Application No. PCT/EP2020/078527 (Feb. 5, 2021).

* cited by examiner

LOAD DETECTION DEVICE

RELATED APPLICATIONS

This application claims the benefit under 35 U.S.C. § 371 as a U.S. National Application of application no. PCT/EP2020/078527 filed on 12 Oct. 2020, which claims benefit of German Patent Application no. 10 2019 217 592.9 filed 14 Nov. 2019, the contents of which are hereby incorporated by reference in their entireties.

FIELD OF THE DISCLOSURE

The invention relates to a load detection device with a height-level measuring unit by means of which the height level of a vehicle can be detected and at least one height-level signal that characterizes the height level can be produced, and with an evaluation unit connected to the height-level measuring unit, by means of which, taking the height-level signal into account, the mass of a load of the vehicle can be determined.

BACKGROUND

DE 10 2014 215 440 A1 describes a method for determining the total weight of a motor vehicle having a suspension which, in turn, comprises at least one spring element, wherein a spring deflection of at least one of the at least one spring elements is measured, and with reference to this, the total weight of the motor vehicle is determined.

The spring deflection is a measure for the height level. If the height level alone is used to determine the mass of the load, the problem arises that the suspension of a vehicle parked on a horizontal ground surface will as a rule be deflected differently from that of a vehicle parked on a ground surface that is not horizontal. Thus, to determine the mass of the load either the vehicle has to be moved or it must be parked on a horizontal ground surface and loaded on that surface.

SUMMARY

Starting from there, the purpose of the present invention is to be able to determine the mass of the load regardless of the nature of the ground surface, even when the vehicle is at rest.

This objective is achieved by a load detection device according to Claim 1 and by a method according to Claim 8. Preferred further developments of the invention are indicated in the subordinate claims and in the description that follows.

A load detection device according to the invention comprises a height-level measuring unit by means of which the height level of a vehicle can be detected and at least one height-level signal that characterizes the height level can be produced, and an evaluation unit connected to the height-level measuring unit, by means of which a load of the vehicle can be determined taking into account and/or on the basis of the height-level signal, and a position-measuring unit by means of which the position of the vehicle relative to the mid-point of the earth can be determined and at least one position signal that characterizes this position can be produced, wherein by means of the evaluation unit, which is in particular also connected to the position-measuring, unit, the mass of the load, in particular additionally taking into account and/or on the basis of the position signal, can be determined.

With the help of the position signal the influence of the nature of the ground surface on the height level and/or on the height-level signal can be discounted and/or eliminated. In particular the load can be determined with greater accuracy and no longer depending on where the vehicle is parked. Preferably, the height level of the vehicle and the position of the vehicle when the vehicle is at rest can be detected. In particular it is no longer necessary to move the vehicle.

The vehicle is preferably a vehicle with wheels. Advantageously, the vehicle has a plurality of wheels, for example four or at least four, or six or at least six, or eight or at least eight vehicle wheels. Preferably the vehicle has a plurality, for example two or at least two, or three or at least three, or four or at least four vehicle axles. Each of the vehicle axles preferably carries two, or at least two or more of the vehicle wheels.

The vehicle preferably comprises a vehicle body. The vehicle body forms or contains for example bodywork or a vehicle frame. Preferably the vehicle wheels and/or the vehicle axles are connected to the vehicle body by wheel suspensions and/or by axle suspensions. For example, the vehicle wheels and/or the vehicle axles are connected to the vehicle body by a wheel suspension in each case and/or by an axle suspension in each case. Advantageously, the vehicle wheels and/or the vehicle axles are supported by and/or connected to the vehicle body, preferably elastically by vehicle springs in each case. For example, the vehicle wheels and/or the vehicle axles are supported on and/or connected to the vehicle body, preferably elastically, by a vehicle spring in each case or by at least one vehicle spring or by a plurality of vehicle springs in each case.

The vehicle is preferably an agricultural vehicle. Preferably the vehicle is a motor vehicle. In particular, the vehicle is a road vehicle or a rail vehicle. Advantageously, the vehicle is a goods vehicle or a passenger-carrying vehicle. For example, the vehicle is a truck, a passenger car, a bus, a goods train, or a passenger train.

Preferably the vehicle, in particular its vehicle wheels, are at rest on the ground or a ground surface. Preferably, the vehicle wheels are at rest on the ground surface or a ground surface. The ground surface is or comprises, for example, a road. For example, the ground surface is or comprises a street or a rail track.

According to a further development, the position of the vehicle relative to the mid-point of the earth is indicated and/or defined by the position of a vehicle plane relative to the mid-point of the earth. The vehicle plane preferably extends through and/or is defined by two vehicle axes which in particular are or include the longitudinal axis and the transverse axis of the vehicle. The longitudinal axis of the vehicle is for example called the x-axis. Moreover, the transverse axis of the vehicle is called the y-axis. In particular the said vehicle plane is called the x-y plane. The position of the vehicle relative to the mid-point of the earth is or constitutes, for example, an absolute position of the vehicle or of the vehicle plane relative to the mid-point of the earth.

Preferably, by means of the evaluation unit a mass signal that characterizes the mass of the load can be produced and/or generated. Preferably, the evaluation unit comprises a computing unit, which is in particular a digital computing unit. For example, the evaluation unit comprises a microcontroller.

In one version the position-measuring unit comprises one or more, for example two or at least two, or three or at least three acceleration sensors. By means of the acceleration sensors, in particular the gravitational acceleration at the location of the acceleration sensor, or of the respective acceleration sensor or that of the acceleration sensors can be detected and/or measured. Preferably, the acceleration sensors are directed and/or orientated differently, for example perpendicularly to one another. Advantageously, one of the acceleration sensors is directed and/or orientated in the longitudinal direction of the vehicle and another of the acceleration sensors is directed and/or orientated in the transverse direction of the vehicle. The position-measuring unit is for example arranged on an unsprung mass, or else on a sprung mass of the vehicle. For example, the acceleration sensors of the position-measuring unit are arranged on an unsprung mass, or else on a sprung mass of the vehicle. The position-measuring unit is made, for example, in the form of a micro-system (MEMS). In particular, the position-measuring unit is in the form of an inertial measuring unit. Position-measuring units are used, for example, in mobile computers (such as Notebooks, Tablets, mobile telephones . . . ) and in remotes for computer games.

The height level is understood to be the distance of the vehicle and/or the vehicle body from the ground surface and/or from the vehicle wheels and/or from the vehicle axles, preferably in the vertical direction of the vehicle. For example, the height level is given and/or characterized by the distance of the vehicle body from the vehicle wheels and/or from the vehicle axles and/or from the ground surface, preferably in the vertical direction of the vehicle. For example, the height level is given and/or characterized by the spring deflection of the vehicle wheels and/or the vehicle axles.

According to a further development, the height-level measuring unit comprises one or at least one height-level sensor or a plurality of height-level sensors, for example two or at least two, or three or at least three or four or at least four height-level sensors. Preferably, each of the height-level sensors is associated with one of the vehicle wheels and/or one of the vehicle axles. In particular, by means of each of the height-level sensors the height level in the area of the vehicle wheel associated with that height-level sensor or the vehicle axle associated with it can be detected. For example, by means of each of the height-level sensors the distance of the vehicle body from the vehicle wheel associated with it or the vehicle axle associated with it can be detected. Advantageously, with each of the height-level sensors the deflection of the associated vehicle wheel and/or the associated vehicle axle can be detected.

The height level in the area of each vehicle wheel is in particular the distance between the vehicle wheel concerned and the vehicle body, preferably in the vertical direction of the vehicle. The height level in the area of each vehicle axle is for example the distance between the vehicle axle concerned and the vehicle body, preferably in the vertical direction of the vehicle.

Preferably, the vehicle has at least one leaf suspension. In particular, the leaf suspension is arranged between on the one hand a vehicle wheel and/or a vehicle axle, and on the other hand a vehicle body. Preferably, the height-level measuring unit is associated with the leaf suspension. Thus, in the case of a vehicle with leaf suspension, for example a bus with leaf suspension instead of air suspension, by means of the height-level measuring unit and/or a height-level sensor the distance of the vehicle body from the vehicle wheel and/or the vehicle axle associated with it can be detected.

The load can consist of various goods. For example, the load can consist of individually packaged goods or bulk material. In one version the load, for example, consists of one or more persons.

As a rule, the exact determination of the number of people in a passenger transport vehicle is only possible by counting them manually. By virtue of the sale of tickets, especially tickets not associated with a particular journey and/or tickets provided for several people, determining the number of people is difficult since it is not certain whether and to what extent the tickets are used. This relates for example to group tickets, monthly tickets, etc. Although light screens could be used to count the number of passengers, that method is prone to error, particularly when people board the vehicle in a group and thus get on closely one after another.

Preferably, by means of the evaluation unit the number of people can be determined from the mass of the load and/or the change in that mass. It is possible for inaccuracies to occur due to baggage, push-chairs, bicycles or the like, but as a rule a rough or approximate determination of the number of people is possible. Preferably, by means of the evaluation unit a number-of-persons signal that characterizes the number of people can be produced and/or provided.

According to a further development, a location unit is provided, by means of which the location of the vehicle can be detected. Preferably a storage unit is provided, in which map information that represents a street map is stored. Advantageously an association unit is provided, by means of which the mass of the load and/or the number of passengers and/or the location of the vehicle can be linked to the street map and/or to the map information. In that way often-frequented stretches can be identified. In addition, it can be indicated by mobile telephone how full the vehicle is at the time and whether, for example in cities, it is worth waiting for the next bus or subway vehicle which might be emptier. To relieve a stretch the use of additional buses is possible. The use of public transport thus becomes more attractive since there is less crowding. Planning also becomes simpler.

The association unit is preferably connected with the storage unit and/or with the evaluation unit. For example, the association unit is connected with the evaluation unit by radio. Advantageously, the location unit is connected to the evaluation unit and/or to the association unit.

The invention also relates to a method for detecting the load of the vehicle or of a vehicle, in particular by means of the load detection device or a load detection device, wherein by means of the height-level measuring unit or a height-level measuring unit, the height level of the vehicle is detected and at least one height-level signal that characterizes the height level is produced, by taking which into account and/or on the basis of which, in particular by means of the evaluation unit or an evaluation unit, the mass of the load or of a load of the vehicle is determined, wherein by means of the position-measuring unit or a position-measuring unit, the position of the vehicle relative to the mid-point of the earth is detected and at least one position signal that characterizes that position is generated, and wherein, in particular by means of the evaluation unit, the mass of the load is determined, in particular also taking into account and/or on the basis of the said position signal.

The method can be developed further in accordance with all the embodiments described in connection with the load detection device. Furthermore, the load detection device can be developed further in accordance with all the embodiments described in connection with the method. Preferably, in particular by means of the evaluation unit, a mass signal that characterizes the mass of the load can be produced and/or generated.

With the help of the position signal the influence of the nature of the ground surface on the height level and/or on the height-level signal can be discounted and/or eliminated. Preferably, the height level of the vehicle and the position of the vehicle when the vehicle is at rest can be determined. Advantageously, the position of the vehicle relative to the mid-point of the earth is determined before and/or during and/or after the loading of the vehicle with its load.

The vehicle is preferably a vehicle with wheels. Advantageously, the vehicle has a plurality of vehicle wheels, for example four or at least four, or six or at least six, or eight or at least eight wheels. Preferably the vehicle has a plurality of vehicle axles, for example two or at least two, or three or at least three, or four or at least four axles. Each of the vehicle axles preferably carries preferably two or at least two, or several of the vehicle wheels.

The vehicle preferably comprises a vehicle body. The vehicle body forms or comprises, for example, bodywork or a vehicle frame. Preferably, the vehicle wheels and/or the vehicle axles are connected to the vehicle body by wheel suspensions and/or by axle suspensions. For example, the vehicle wheels and/or the vehicle axles are connected to the vehicle body, in each case, by a respective wheel suspension and/or by a respective axle suspension. Advantageously, the vehicle wheels and/or the vehicle axles are supported on and/or connected to the vehicle body, preferably elastically, by vehicle springs. For example, the vehicle wheels and/or the vehicle axles are supported on and/or connected to the vehicle body, preferably elastically, in each case by a respective vehicle spring or by at least one respective vehicle spring or by a plurality of respective vehicle springs.

The vehicle is preferably an agricultural vehicle. Preferably, the vehicle is a motor vehicle. In particular, the vehicle is a road vehicle or a rail vehicle. Advantageously, the vehicle is a goods vehicle or a passenger transport vehicle.

Preferably the vehicle, in particular with its vehicle wheels, is standing on the ground, or on a ground surface. Preferably, the vehicle wheels are standing on the ground, or on a ground surface. The ground surface is or includes, for example, a road. For example, the ground surface is or includes a street or a rail track.

According to a further development, the position of the vehicle relative to the mid-point of the earth is indicated and/or defined by the position of a vehicle plane relative to the mid-point of the earth. The vehicle plane preferably extends between and/or is defined by two vehicle axes which in particular are or include the longitudinal axis and the transverse axis of the vehicle. The position of the vehicle relative to the mid-point of the earth is or forms, for example, an absolute position of the vehicle or of the vehicle plane relative to the mid-point of the earth.

In one version the position measuring unit comprises one or more acceleration sensors, for example two or at least two, or three or at least three acceleration sensors. By means of the acceleration sensors in particular the gravitational acceleration at the location of the acceleration sensor or the respective acceleration sensor or sensors is detected and/or measured. Preferably the acceleration sensors are differently directed and/or orientated, for example perpendicularly to one another. Advantageously, one of the acceleration sensors is directed and/or orientated in the longitudinal direction of the vehicle and another acceleration sensor is directed and/or orientated in the transverse direction of the vehicle. The position measuring unit is, for example, arranged on an unsprung mass or on a sprung mass of the vehicle. For example, the acceleration sensors of the position measuring unit are arranged on an unsprung mass or on a sprung mass of the vehicle. In particular, the position measuring unit is in the form of an inertial measuring unit.

The height level is understood to be the distance of the vehicle and/or the vehicle body from the ground surface and/or from the vehicle wheels and/or from the vehicle axles, preferably in the vertical direction of the vehicle. For example, the height level is given and/or characterized by the distance of the vehicle body from the vehicle wheels and/or from the vehicle axles and/or from the ground surface, preferably in the vertical direction of the vehicle. For example, the height level is given and/or characterized by the spring deflection of the vehicle wheels and/or the vehicle axles.

According to a further development, the height-level measuring unit comprises one or at least one height-level sensor or a plurality of height-level sensors, for example two or at least two, or three or at least three or four or at least four height-level sensors. Preferably, each of the height-level sensors is associated with one of the vehicle wheels and/or one of the vehicle axles. In particular, by means of each of the height-level sensors the height level in the area of the vehicle wheel associated with that height-level sensor or the vehicle axle associated with it can be detected. For example, with each of the height-level sensors the distance of the vehicle body from the vehicle wheel associated with it or the vehicle axle associated with it can be detected. Advantageously, with each of the height-level sensors the deflection of the associated vehicle wheel and/or the associated vehicle axle can be detected.

The height level in the area of each vehicle wheel is in particular the distance between the vehicle wheel concerned and the vehicle body, preferably in the vertical direction of the vehicle. The height level in the area of each vehicle axle is for example the distance between the vehicle axle concerned and the vehicle body, preferably in the vertical direction of the vehicle.

The load can consist of various goods. For example, the load can consist of individually packaged goods or bulk material. In one version the load, for example, consists of one or more people.

Preferably, in particular by means of the evaluation unit or an evaluation unit the number of people is determined from the mass of the load and/or from the change of that mass. Preferably, in particular by means of the evaluation unit a number-of-persons signal that characterizes the number of persons is produced and/or provided.

According to a further development, in particular by means of the location unit or a location unit, the location of the vehicle is determined. Preferably, in particular by means of the storage unit or a storage unit, a street map or map information that represents a street map is stored and/or provided. Advantageously, in particular by means of the association unit or an association unit, the mass of the load and/or the number of passengers and/or the location of the vehicle is linked to the street map and/or to the map information.

BRIEF DESCRIPTION OF THE DRAWINGS

Below, the invention is explained with reference to a preferred embodiment, having regard to the drawings, which show.

DETAILED DESCRIPTION

Figure 1:
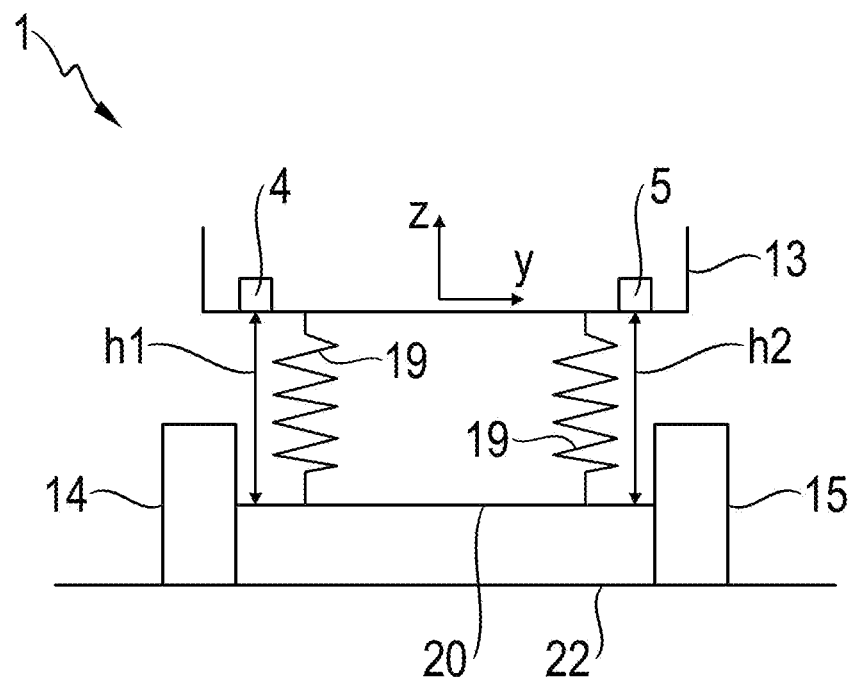
FIG. 1: A schematic front view of a vehicle with a load detecting device according to an embodiment.
Figure 2:
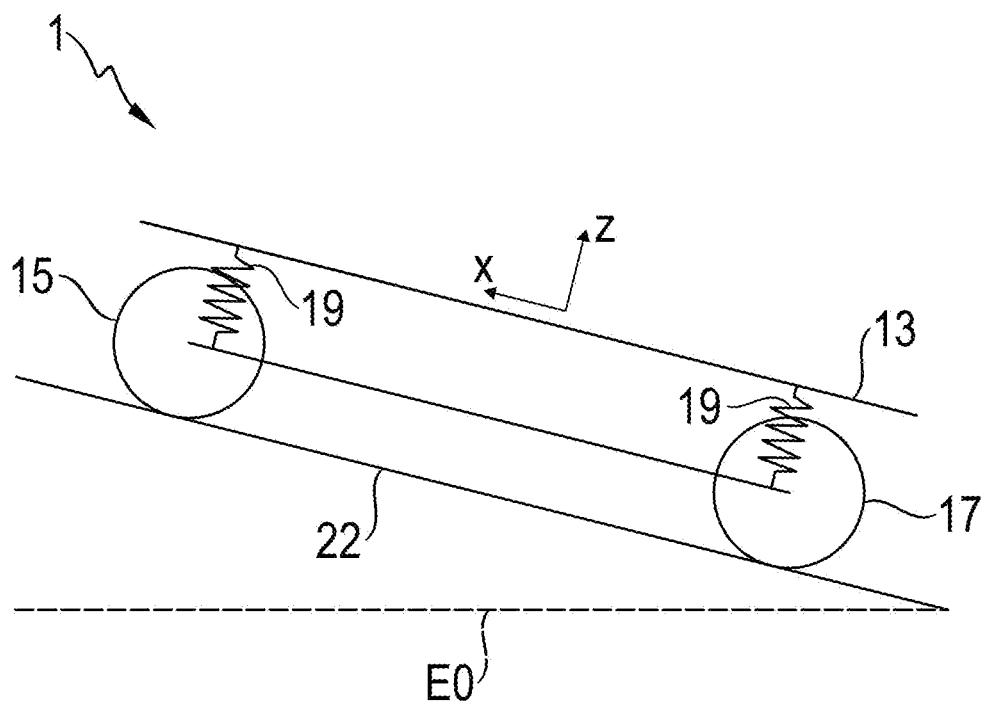
FIG. 2: A schematic side view of the vehicle.
Figure 3:
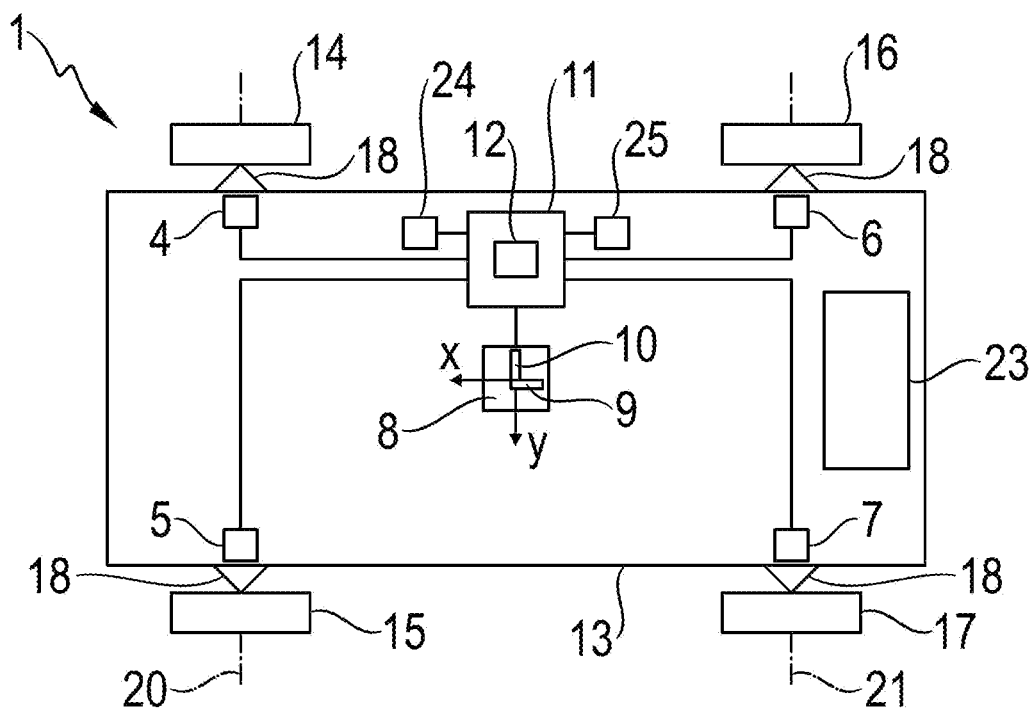
FIG. 3: A schematic view, seen from above, of the vehicle after a loading process.
Figure 4:
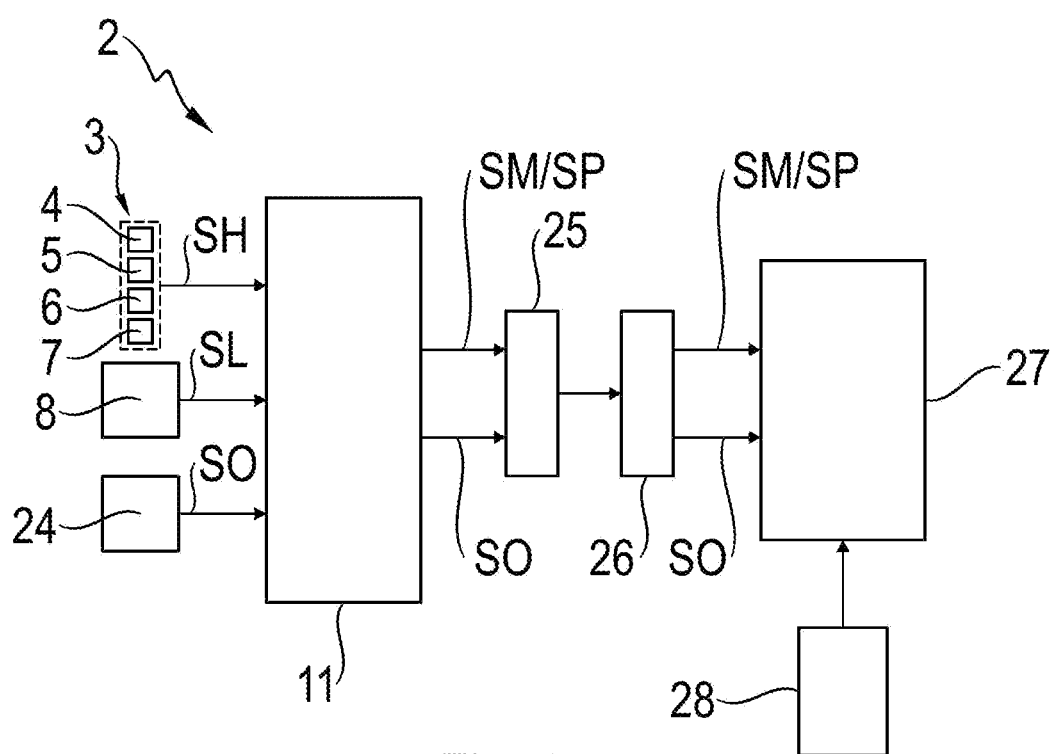
FIG. 4: A schematic view of the load detection device.

FIGS. 1 to 3 show different schematic views of a vehicle 1 with a load detection device 2 according to an embodiment, wherein the load detection device 2, which can also be seen in FIG. 4, comprises a height-level measuring unit 3 with a plurality of height-level sensors 4, 5, 6 and 7, a position-measuring unit 8 with a plurality of acceleration sensors 9 and 10, and an evaluation unit 11 with a central computing unit 12. The vehicle 1 has a vehicle body 13 and four vehicle wheels 14, 15, 16 and 17, which are connected to the vehicle body 13 by way of wheel suspensions 18. In addition, the vehicle wheels 14, 15, 16, and 17 are supported on the vehicle body 13 by a vehicle spring 19 in each case. The vehicle 1 has two vehicle axles 20 and 21, wherein the vehicle wheels 14 and 15 are associated with a first one 20 of the vehicle axles and the vehicle wheels 16 and 17 are associated with a second one 21 of the vehicle axles. Each of the vehicle wheels 14, 15, 16 and 17 is associated with one of the height-level sensors 4, 5, 6 and 7 respectively, wherein the height-level sensor 4 is associated with the vehicle wheel 14, the height-level sensor 5 with the vehicle wheel 15, the height-level sensor 6 with the vehicle wheel 16 and the height-level sensor 7 with the vehicle wheel 17. By means of the height-level sensors the distance between the vehicle wheel associated with it and the vehicle body 13 can be determined, so that each of the height-level sensors 4, 5, 6 and 7 connected to the evaluation unit 11 produces a height-level signal SH that characterizes the respective height level and sends that signal to the evaluation unit 11.

The vehicle 1 stands with its vehicle wheels 14, 15, 16 and 17 on a ground surface 22. Furthermore, in FIGS. 1 to 3 the longitudinal direction x of the vehicle, the transverse direction y of the vehicle and the vertical direction z of the vehicle are indicated by arrows. Here, the longitudinal direction x of the vehicle represents the longitudinal axis of the vehicle, the transverse direction y of the vehicle represents the transverse axis of the vehicle and the vertical direction z of the vehicle represents its vertical axis.

FIG. 1 shows a schematic front view of the vehicle 1, in which the first vehicle axle 20 with the vehicle wheels 14 and 15 can be seen. By means of the height-level sensor 4 the distance h1 of the vehicle wheel 14 from the vehicle body 13, specifically in the vertical direction z, can be detected. Likewise, by means of the height-level sensor 5 the distance h2 of the vehicle wheel 15 from the vehicle body 13, specifically in the vertical direction z of the vehicle, can be detected. Correspondingly, by means of the height-level sensor 6 the distance of the vehicle wheel 16 from the vehicle body 13, and by means of the height-level sensor 7 the distance of the vehicle wheel 17 from the vehicle body 13, specifically in the vertical direction z of the vehicle, can be detected.

FIG. 2 shows a schematic side view of the vehicle 1, such that the inclination of the ground surface 22 relative to the horizontal E0 can be seen.

FIG. 3 shows a schematic view of the vehicle 1 as seen from above, the vehicle in this case carrying a load 23. If the vehicle 1 were standing on a horizontal ground surface, the mass of the load 23 could be determined on the basis of the height level signal SH provided by the height-level measuring unit 3. However, the inclination of the ground surface 22 results in deflections of the vehicle wheels which are different from those on a horizontal ground surface, so that a determination of the mass of the load 23 on the basis of the height-level signal alone would be inaccurate.

The acceleration sensors 9 and 10 are in particular identically built but are orientated in different spatial directions, such that the acceleration sensor 9 is orientated in the longitudinal direction x of the vehicle and the acceleration sensor 10 in the transverse direction y of the vehicle. By means of the acceleration sensors 9 and 10 the position of the vehicle relative to the mid-point of the earth can be detected. Moreover, by means of the acceleration sensors 9 and 10 position signals SL which characterize that position can be provided. The position-measuring unit 8 is connected to the evaluation unit 11 so that the position signals SL are made available to the evaluation unit 11. By means of the evaluation unit 11, the mass of the load 23 can therefore be determined on the basis of the height-level signals SH and the position signals SL, and a mass signal SM that characterizes the mass can be generated. If the vehicle is a passenger transporting vehicle, then by virtue of the evaluation unit the number of persons can also be calculated and a persons signal SP that characterizes that number can be produced.

Preferably, the evaluation unit 11 comprises analog-digital converters by means of which the height-level signals SH and the position signals SL are digitalized, so that they can then be processed in digital form by the computer unit 12 which is in particular a digital computer unit. The position of the vehicle 1 is or will be represented in particular by a plane extending through the longitudinal direction x of the vehicle and the transverse direction y of the vehicle, which plane is in particular also called the x-y plane.

In FIG. 3 a location unit 24 connected to the evaluation unit 11 can be seen, by means of which the location of the vehicle 1 can be detected and a location signal SO that characterizes the location of the vehicle can be produced and sent to the evaluation unit 11. Furthermore, there is also a transmitter unit 25 connected to the evaluation unit 11, by means of which the mass signal SM and/or the persons signal SP and the location signal SO can be transmitted to a receiver unit 26 shown in FIG. 4. As shown in FIG. 4 the receiver unit 26 is connected to an association unit 27, which is connected to a storage unit 28 in which map information representing a street map is stored. By means of the association unit 27 the mass of the load and/or the number of passengers and the location of the vehicle 1 can be linked to the street map.

INDEXES

1 Vehicle
2 Load detection device
3 Height-level measuring unit
4 Height-level sensor
5 Height-level sensor
6 Height-level sensor
7 Height-level sensor
8 Position-measuring unit
9 Acceleration sensor
10 Acceleration sensor
11 Evaluation unit
12 Central computing unit
13 Vehicle body
14 Vehicle wheel
15 Vehicle wheel
16 Vehicle wheel 17 Vehicle wheel
18 Wheel suspension
19 Wheel spring
20 Vehicle axle
21 Vehicle axle
22 Ground surface
23 Load
24 Location unit
25 Transmitter unit
26 Receiver unit
27 Association unit
28 Storage unit
E0 Horizontal
h1 Distance
h2 Distance
SH Height-level signal
AL Position signal
SM Mass signal
SO Location signal
SP Persons signal
x Longitudinal direction of the vehicle
y Transverse direction of the vehicle
z Vertical direction of the vehicle

The invention claimed is:

1. A load detection device for a vehicle, the device comprising:
   a height-level measuring unit comprising one or more height-level sensors and configured to detect a height level of a vehicle and further configured to generate at least one height-level signal that characterizes the height level of the vehicle;
   an evaluation unit coupled to the height-level measuring unit, the evaluation unit configured to determine a mass of a load of the vehicle taking into account the at least one height-level signal, wherein the evaluation unit is configured to determine a number of persons from the mass of the load; and
   a position-measuring unit coupled to the evaluation unit, the position-measuring unit configured to determine a position of the vehicle relative to a mid-point of the earth and configured to generate at least one position signal that characterizes the position of the vehicle, wherein the evaluation unit is further configured to determine a mass of the load by taking into account the at least one position signal.

2. The device according to claim 1, wherein the position of the vehicle relative to the mid-point of the earth is given by the position of a vehicle plane that extends through a longitudinal axis of the vehicle and a transverse axis of the vehicle relative to the mid-point of the earth.

3. The device according to claim 2, wherein the position-measuring unit comprises one or more acceleration sensors.

4. The device according to claim 1, wherein the vehicle has a plurality of vehicle wheels and each of the one or more height-level sensors is associated with a respective vehicle wheel.

5. The device according to claim 4, further comprising:
   a location unit configured to determine a location of the vehicle;
   a storage unit in which map information representing a street map is stored; and
   an association unit configured to link the number of people and the location of the vehicle to the street map.

6. The device according to claim 1, further comprising:
   a location unit configured to determine a location of the vehicle;
   a storage unit in which map information representing a street map is stored; and
   an association unit configured to link the number of people and the location of the vehicle to the street map.

7. A method for detecting a load of a vehicle, the method comprising:
   determining, by a height-level measuring unit, a height level of a vehicle;
   generating, by the height-level measuring unit, at least one height-level signal that characterizes the height level;
   detecting, by a position-measuring unit, a position of the vehicle relative to a mid-point of the earth; and
   generating, by the position-measuring unit, at least one position signal that characterizes the position of the vehicle; and
   determining a mass of a load of the vehicle by taking into account the at least one height-level signal and taking into account the at least one position signal, wherein the load consists of one or more persons and determining the mass of the load includes determining a number of people based on the mass of the load.

8. The method according to claim 7, comprising providing the position of the vehicle relative to the mid-point of the earth by reference to a position of a vehicle plane that extends through a longitudinal axis of the vehicle and a transverse axis of the vehicle relative to the mid-point of the earth.

9. The method according to claim 7, wherein the position-measuring unit comprises one or more acceleration sensors and detecting the position of the vehicle is performed at least in part with the one or more acceleration sensors.

10. The method according to claim 7, wherein the height-level measuring unit comprises one or more height-level sensors, and determining the height of the vehicle is performed using the one or more height-level sensors.

11. The method according to claim 10, wherein the vehicle comprises a plurality of vehicle wheels and each of the height-level sensors is associated with a respective vehicle wheel.

12. The method according to claim 7, further comprising:
   preparing information representing a street map; and
   linking the number of people and the location of the vehicle to the street map.

\* \* \* \* \*